(12) United States Patent
Pencak et al.

(10) Patent No.: US 11,358,467 B2
(45) Date of Patent: Jun. 14, 2022

(54) FUEL FILLER LID ASSEMBLY

(71) Applicant: NISSAN NORTH AMERICA, INC., Franklin, TN (US)

(72) Inventors: Jeffrey Pencak, Howell, MI (US); Paul Dyde, Walled Lake, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/070,805

(22) Filed: Oct. 14, 2020

(65) Prior Publication Data

US 2022/0111724 A1    Apr. 14, 2022

(51) Int. Cl.
*B60K 15/05*    (2006.01)

(52) U.S. Cl.
CPC ........ *B60K 15/05* (2013.01); *B60K 2015/053* (2013.01)

(58) Field of Classification Search
CPC ............................ B60K 15/05; B60K 2015/53
USPC ...................................................... 296/97.22
See application file for complete search history.

(56) References Cited

U.S. PATENT DOCUMENTS

| 5,437,491 A | 8/1995 | Nedbal et al. |
| 5,664,811 A * | 9/1997 | Martus ................... B60K 15/05 292/144 |
| 8,382,188 B2 * | 2/2013 | Woodworth ........... B60K 15/05 296/97.22 |
| 2012/0153660 A1 * | 6/2012 | Golden ................. B60R 13/005 296/97.22 |

FOREIGN PATENT DOCUMENTS

JP            5488355 B2    5/2014

* cited by examiner

*Primary Examiner* — Mahmoud Gimie
(74) *Attorney, Agent, or Firm* — Global IP Counselors, LLP

(57) ABSTRACT

A fuel filler lid assembly includes a fuel filler lid. The fuel filler lid configured to be supported to a vehicle body that has a fuel filler opening. The fuel filler lid has a first part that is movable with respect to the vehicle body between an open state and a closed state. The open state enables access to the fuel filler opening. The closed state encloses the fuel filler opening. The fuel filler lid has a second part that is indented with respect to the first part by a user operation surface. The user operation surface is accessed by a user to move the fuel filler lid between the open state and the closed state.

16 Claims, 3 Drawing Sheets

FUEL FILLER LID ASSEMBLY

BACKGROUND

Field of the Invention

The present invention generally relates to fuel filler lid assembly. More specifically, the present invention relates to fuel filler lid assembly for enclosing a fuel nozzle opening.

Background Information

Vehicles are equipped with fuel filler openings that lead to filler pipes in communication with a fuel tank of the vehicle to enable filling the vehicle with fuel. Vehicles can be equipped with fuel filler lids to enable access to the fuel filler openings or enclose the fuel filler openings.

SUMMARY

In view of the state of the known technology, one aspect of the present disclosure is to provide a fuel filler lid assembly comprising a fuel filler lid. The fuel filler lid configured to be supported to a vehicle body that has a fuel filler opening. The fuel filler lid has a first part that is movable with respect to the vehicle body between an open state and a closed state. The open state enables access to the fuel filler opening. The closed state encloses the fuel filler opening. The fuel filler lid has a second part that is indented with respect to the first part by a user operation surface. The user operation surface is accessed by a user to move the fuel filler lid between the open state and the closed state.

In view of the state of the known technology, another aspect of the present disclosure is to provide a vehicle comprising a vehicle body and a fuel filler lid. The vehicle body has a fuel filler opening. The fuel filler lid is supported to the vehicle body. The fuel filler lid has a first part that is movable with respect to the vehicle body between an open state and a closed state. The open state enables access to the fuel filler opening. The closed state covers the fuel filler opening. The fuel filler lid has a second part that is indented with respect to the first part by a user operation surface. The user operation surface is accessed by a user to move the fuel filler lid between the open state and the closed state.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
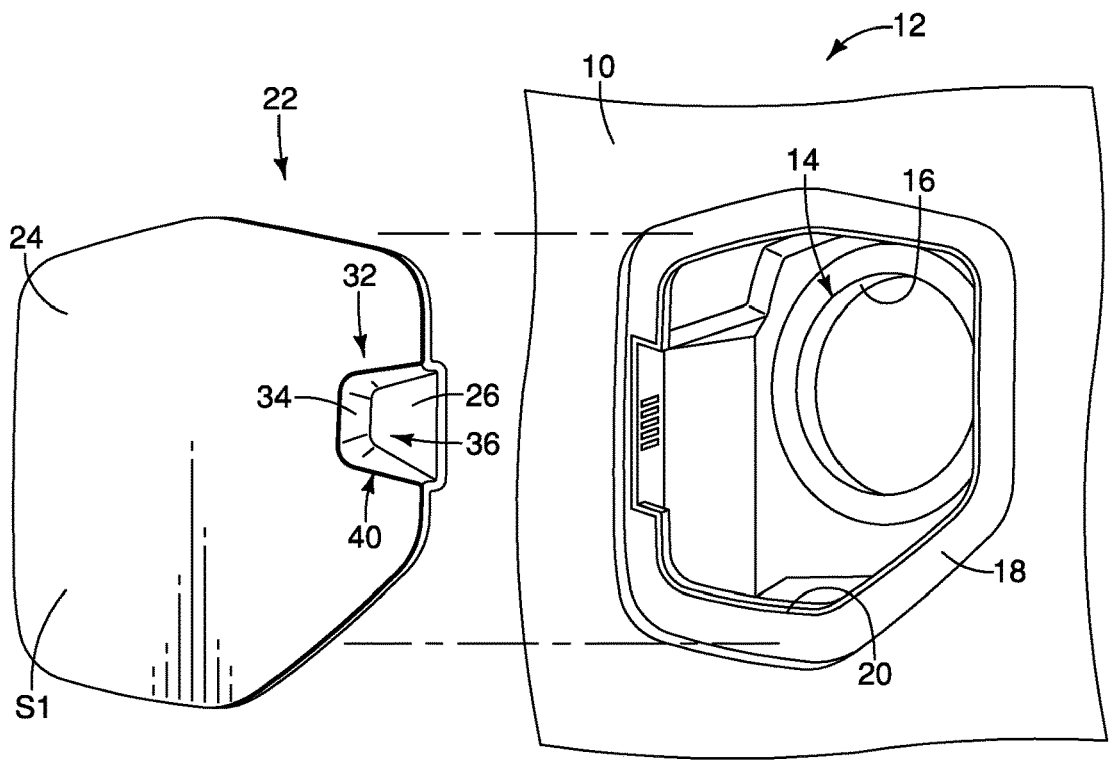
FIG. 1 is an exploded view of a fuel filler lid assembly in accordance with an illustrated embodiment.

Referring initially to FIG. 1, a portion of a vehicle body 10 of a vehicle is illustrated as having a fuel filler lid assembly 12 in accordance with an illustrated embodiment. The vehicle body 10 includes a recess 14 that leads to a fuel filler opening 16. The recess 14 is provided on a side surface of the vehicle and is recessed inwardly into the vehicle body 10. Therefore, the vehicle body 10 has the fuel filler opening 16 that leads to a fuel tank (not shown) of the vehicle. The fuel filler opening 16 is shaped and designed for receiving a fuel nozzle (not shown) to fill the fuel tank.

As shown in FIG. 1, the fuel filler lid assembly 12 preferably further comprises a fuel filler base 18 that is fixed to the vehicle body 10. The fuel filler base 18 is a plastic trim that can be provided around a perimeter of the recess 14 and have an opening 20 can accommodate to the fuel filler opening 16 in order to accommodate the fuel nozzle therethrough. It will be apparent to those skilled in the vehicle field from this disclosure that the fuel filler base 18 can alternatively be disposed in the recess 14. Therefore, the fuel filler base 18 can have a shape and contouring that corresponds to the shape and contouring of the recess 14. It will be apparent to those skilled in the vehicle field from this disclosure that the fuel filler base 18 is optional and that the fuel filler lid 22 can be provided to a vehicle without the fuel filler base 18.

The fuel filler lid assembly 12 comprises a fuel filler lid 22 that is configured to be supported to the vehicle body 10. In the illustrated embodiment, the fuel filler lid 22 has a first part 24 and a second part 26. The first and second parts 24 and 26 are preferably rigid components made of plastic. In the illustrated embodiment, the first part 24 is a main body of the fuel filler lid 22 that is movable with respect to the vehicle body 10 between an open state and a closed state. The first part 24 is open in the opened state to enable access to the fuel filler opening 16 as shown in FIG. 3. The first part 24 is in the closed state to enclose the fuel filler opening 16 as seen in FIG. 2.

In the illustrated embodiment, the second part 26 is movable with respect to the first part 24 as the first part 24 moves between the open state and the closed state, as will be further described below. Also in the illustrated embodiment, the first and second parts 24 and 26 of the fuel filler lid 22 has a color that is the same as a color of the vehicle body 10. Therefore, the fuel filler lid assembly 12 is preferably designed such that the fuel filler lid 22 appears visually consistent with the vehicle body 10.

As shown in FIG. 3, the fuel filler lid 22 is supported to the vehicle body 10. In particular, the fuel filler lid 22 is movably attached to the recess 14 of the vehicle body 10 via a hinge 28. Therefore, the fuel filler lid 22 includes the hinge 28 that enables the fuel filler lid 22 to move with respect to the vehicle body 10. Alternatively speaking, the first part 24 is hingedly or swingably supported with respect to the vehicle body 10 between the open and closed states. The fuel filler lid 22 can be movably mounted to the vehicle body 10 directly such as at the recess 14, as shown. Alternatively, it will be apparent to those skilled in the vehicle field from this disclosure that the fuel filler lid 22 can be movably mounted to the fuel filler base 18 in a conventional manner. In particular, the first part 24 is swingably attached to the vehicle body 10 by the hinge 28.

Figure 2:
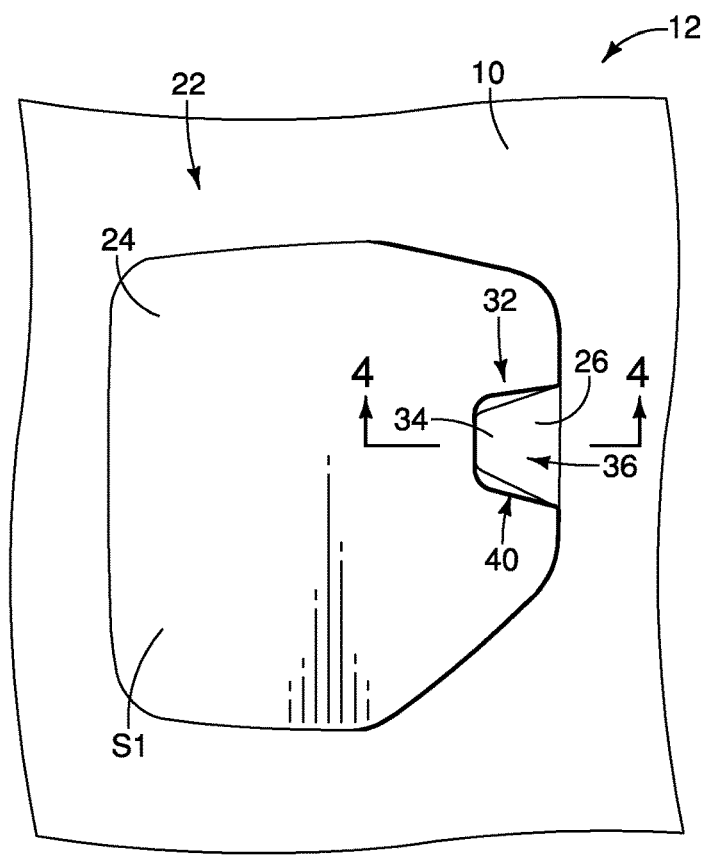
FIG. 2 is a plan view of the fuel filler lid assembly of FIG. 1 having a fuel filler lid in a closed state.
Figure 3:
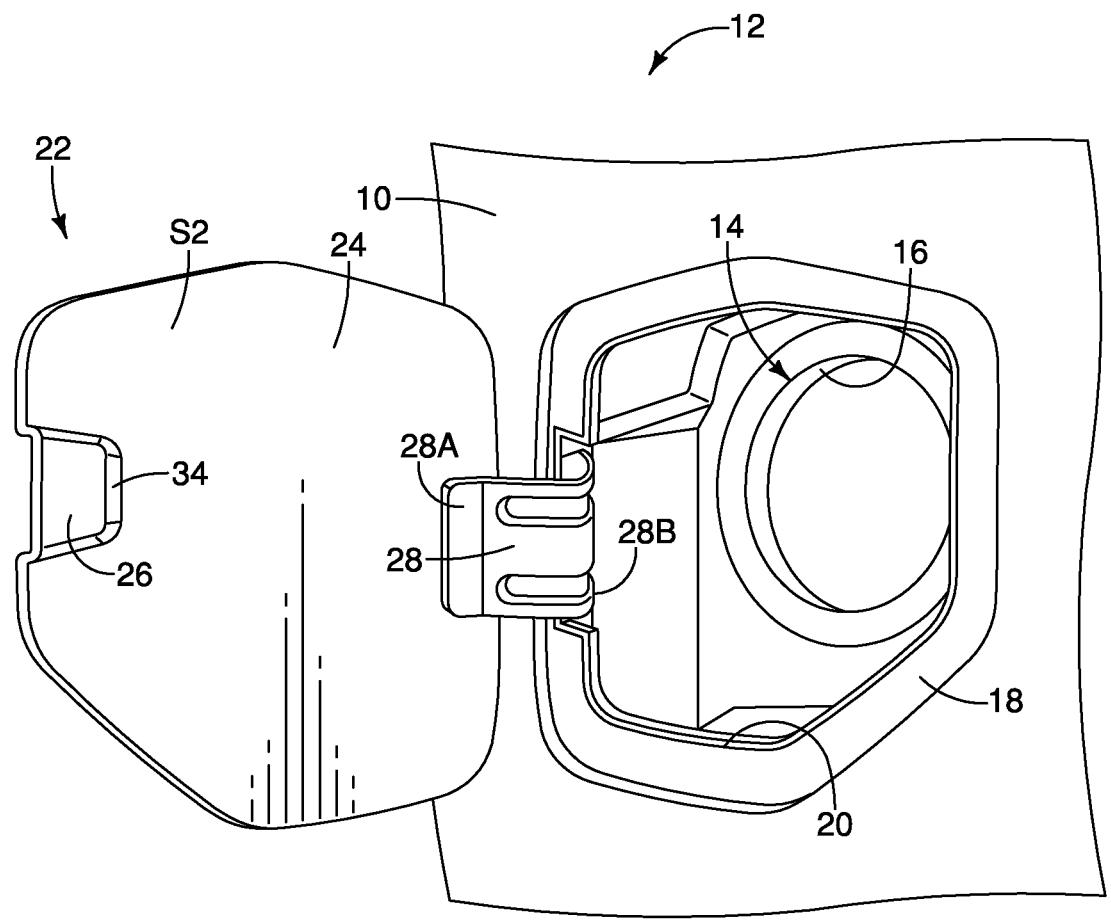
FIG. 3 is a perspective view of the fuel filler lid assembly of FIGS. 2 and 3 having a fuel filler lid in an opened state.

The first part 24 includes an exterior facing side S1 (as shown in FIGS. 1 and 2) and an inboard facing side S2 (as shown in FIG. 3). The hinge 28 is positioned on the inboard facing side S2 of the first part 24. The hinge 28 has a first end 28A that is attached to the inboard facing side S2 of the first part 24 and a second end 28B that is attached to the recess 14 or to the fuel filler base 18 in a conventional manner. Preferably, the hinge 28 is biased so that the first part 24 is biased into the closed state.

As shown in FIG. 2, in that closed state, first part 24 extends substantially in the same plane with the outer surface of the vehicle body 10. That is, the first part 24 is positioned within the recess 14 so that the first part 24 is at least substantially flush with respect to the vehicle body 10 when the first part 24 is in the closed state. The fuel filler lid 22 has an overall shape that substantially corresponds to an overall shape of the recess 14. More specifically, the first and second parts 24 and 26 together preferably have an overall shape that substantially covers the recess 14 and the fuel filler base 18 when the fuel filler lid 22 is in the closed state.

In the illustrated embodiment, the aperture 32 is a cutout at a side portion of the first part 24. In particular, the aperture 32 is a cutout on the side portion that is opposite of a side portion of the first part 24 that has the hinge 28. Alternatively speaking, the aperture 32 is located on a side edge of the first part 24. It will be apparent to those skilled in the vehicle field from this disclosure that the first part 24 can include alternative or additional cutout(s) that is/are positioned on other parts of the fuel filler lid assembly 12, such as on a top or bottom portion of the first part 24. It will be apparent to those skilled in the vehicle field from this disclosure that the fuel filler lid 22 can include additional part(s) similar to the second part 26 that corresponds to any additional cutout(s).

In the illustrated embodiment, the second part 26 of the fuel filler lid is integrally attached to the first part 24 so that the second part 26 is disposed within the aperture 32. In particular, the first and second parts 24 and 26 are initially separately formed and later bonded to each other. That is, the first part 24 is formed as having the aperture 32 that is a cutout on the side edge of the first part 24. Therefore, the aperture 32 of the first part 24 has a shape that substantially corresponds to a shape of the second part 26 so that the second part 26 is fixed to the aperture 32 to basically enclose the aperture 32. It will be apparent to those skilled in the vehicle field from this disclosure that the shape of the aperture 32 and the second part 26 can vary from the aperture 32 and the second part 26 illustrated herein as needed and/or desired.

In particular, in the illustrated embodiment, the first and second parts 24 and 26 are bonded by non-mechanical bonding (e.g., not using fasteners or mechanical components). The first and second parts 24 and 26 are then attached so that the second part 26 is fitted into the aperture 32. Therefore, the second part 26 of the fuel filler lid 22 is integrally attached to the first part 24 so that the second part 26 is disposed within the aperture 32.

For example, the first and second parts 24 and 26 can be bonded by conventional methods of plastic bonding, such as using adhesives including cyanoacrylate adhesives, UV curable adhesives, methyl methacrylate adhesives, as well as some epoxy and structural adhesives. Alternatively, the first and second parts 24 and 26 can be bonded by plastic welding using pressing, heating, and cooling of the first and second parts 24 and 26. Additionally, bonding methods such as plastic welding, contact welding and/or heat sealing can be used to bond the first and second parts 24 and 26 together.

As best seen in FIGS. 1 and 3, the second part 26 extends from the first part 24 in a direction towards the fuel filler opening 16 so that the second part 26 is closer to the fuel filler opening 16 than the first part 24 is to the fuel filler opening 16. In particular, the second part 26 is disposed closer the recess 14 than the first part 24 is to the recess 14. Therefore, the second part 26 is indented with respect to the first part 24 when the first part 24 is in both open state and the closed state. Alternatively speaking, the second part 26 is depressed with respect to the main body when the main body is in the open and closed position. That is the second part 26 is not flush or not on the same plane as the vehicle body 10.

Figure 4:
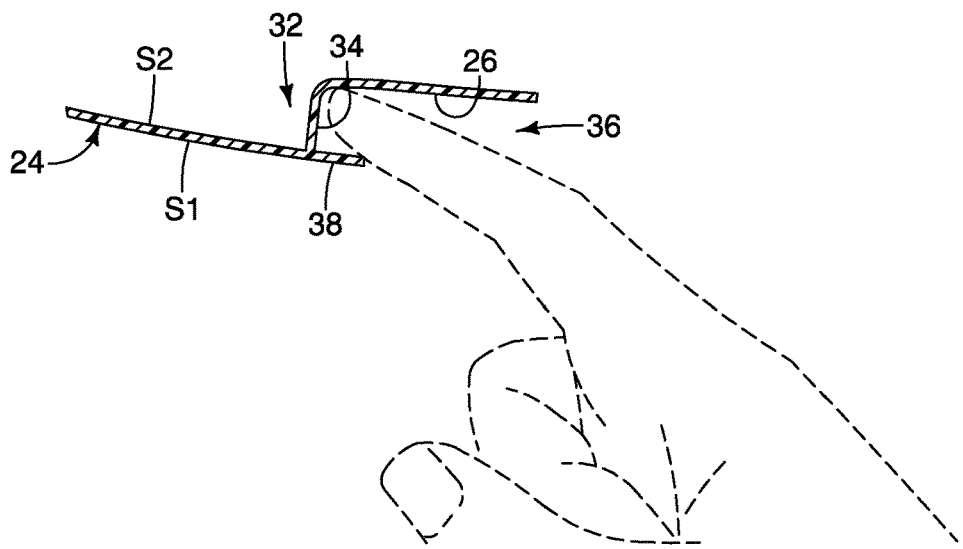
FIG. 4 is a cross-sectional view of the fuel filler lid assembly taken along lines 4-4 in FIG. 3.

As best seen in FIG. 4, the first and second parts 24 and 26 are integrally attached by a connecting surface 34. In particular, the first and second parts 24 and 26 are connected to each other by the connecting surface 34. The connecting surface 34 extends from the first part 24 to the second part 26 in a direction towards the recess 14 when the first part 24 is in the closed state. The fuel filler lid 22 has a pocket 36 formed by the connection of the second part 26, the connecting surface 34 and a protruding portion 38 of the first part 24. The protruding portion 38 protrudes from a main body of the first part 24 to overlap slightly with second part 26 as seen from a cross-sectional view taken along line 4-4 in FIG. 2, which is shown in FIG. 4. The pocket 36 of the first part 24 serves as a user operation portion 40 of the fuel filler lid 22. That is, a user can access the user operation portion 40 to pull the first part 24 from the closed position to the open position. As shown in FIG. 2, the pocket 36 is hidden from an outside lateral view of the fuel filler lid 22 when in the closed state over the fuel filler opening 20. That is, the pocket 36 is not seen from the outside lateral view, such as the view illustrated in FIG. 2. In the illustrated embodiment, the aperture 32 is defined by the pocket 36.

Figure 5:
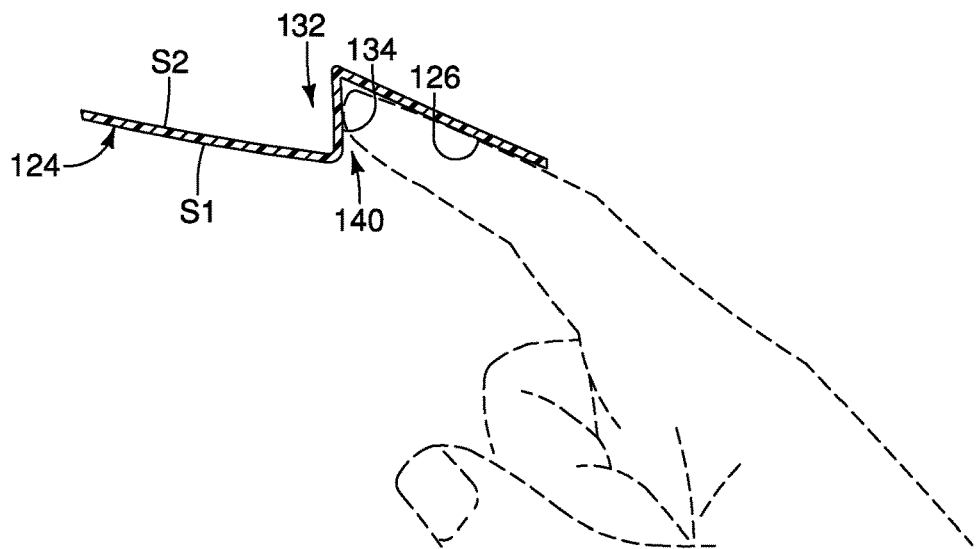
FIG. 5 is a cross-sectional view of a portion of a modified fuel lid assembly.

Referring now to FIG. 5, a portion of a modified fuel filler lid assembly 112 that can be implemented with the vehicle body 10 of the first illustrated embodiment is illustrated. That is, the modified fuel filler lid assembly 12 can replace the fuel filler assembly 12 of the first illustrated embodiment. The modified fuel filler lid assembly 112 comprises a modified fuel filler lid 122 that is configured to be supported to the vehicle body 10. In the illustrated embodiment, the modified fuel filler lid 122 has a modified first part 124 and a modified second part 126. Due to the similarities between the modified fuel filler lid assembly 112 and the fuel filler lid assembly 12, all of the components of the modified fuel filler lid assembly 112 that are identical to the components of the fuel filler lid assembly 12 will receive the same reference numerals. All of the modified components that correspond to the components of the fuel filler lid assembly 12 will receive the same reference numerals but increased by 100.

The modified fuel filler lid assembly 112 is basically identical to the fuel filler lid assembly 12 except that the modified first part 124 of the fuel filler lid 122 has a modified aperture 132. In particular, the modified aperture 132 is no longer defined by a pocket 36. Therefore, the modified aperture 132 does not have the protruding portion 38. Rather, the modified first part 124 and the modified second part 126 are connected by a connecting surface 134 that is itself a user operation portion 140. Therefore, the first and second parts 124 and 126 are connected by the user operation portion 140. The user operation portion 140 is accessed by a user to move the fuel filler lid 122 between the open state and the closed state.

Therefore, in the modified fuel filler lid assembly 112, the arrangement of the first part 24 with respect to the second part 26 enables the aperture 132 of the first part 124 to function as a user operation portion 138 in which a user accesses the first part 124 to move the first part 124 with respect to the second part 126. In this way, the second part 126 is accessed by the user to move the fuel filler lid 122 between the open state and the closed state.

General Interpretation of Terms

In understanding the scope of the present invention, the term "comprising" and its derivatives, as used herein, are intended to be open ended terms that specify the presence of the stated features, elements, components and/or groups but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the fuel filler lid assembly. Accordingly, these terms, as utilized to describe the present invention should be interpreted relative to a vehicle equipped with the fuel filler lid assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel filler lid assembly comprising:
a fuel filler lid configured to be supported to a vehicle body that has a fuel filler opening, the fuel filler lid having a first part that is movable with respect to the vehicle body between an open state to enable access to the fuel filler opening and a closed state to enclose the fuel filler opening, the fuel filler lid having a second part that is indented with respect to the first part by a user operation surface that is accessed by a user to move the fuel filler lid between the open state and the closed state, the first and second parts being integrally attached by the user operation surface.

2. The fuel filler lid assembly according to claim 1, wherein
the first part of the fuel filler lid having an aperture, the second part of the fuel filler lid being integrally attached to the first part so that the second part is disposed within the aperture.

3. The fuel filler lid assembly according to claim 2, wherein
the aperture of the first part having a shape that corresponds to a shape of the second part.

4. The fuel filler lid assembly according to claim 3, wherein
the aperture is a cutout of a side portion of the first part.

5. The fuel filler lid assembly according to claim 1, wherein
the second part extends from the first part in a direction towards the vehicle body so that the second part is closer to the vehicle body than the first part is to the vehicle body.

6. The fuel filler lid assembly according to claim 1, further comprising
a fuel filler base that is fixed to the vehicle body and having an opening that accommodates the fuel filler opening, the fuel filler lid being pivotally attached to the fuel filler base.

7. A fuel filler lid assembly comprising:
a fuel filler lid configured to be supported to a vehicle body that has a fuel filler opening, the fuel filler lid having a first part that is movable with respect to the vehicle body between an open state to enable access to the fuel filler opening and a closed state to enclose the fuel filler opening, the fuel filler lid having a second part that is indented with respect to the first part by a user operation surface that is accessed by a user to move the fuel filler lid between the open state and the closed state, the fuel filler lid having a pocket formed by the connection of the second part, the user operation surface and a portion of the first part.

8. The fuel filler lid assembly according to claim 7, wherein
the pocket is hidden from an outside lateral view of the fuel filler lid when in the closed state over the fuel filler opening.

9. A vehicle comprising:
a vehicle body having a fuel filler opening; and
a fuel filler lid supported to the vehicle body, the fuel filler lid having a first part that is movable with respect to the vehicle body between an open state to enable access to the fuel filler opening and a closed state to cover the fuel filler opening, the fuel filler lid having a second part that is indented with respect to the first part by a user operation surface that is accessed by a user to move the fuel filler lid between the open state and the closed state, the first and second parts are integrally attached by the user operation surface.

10. The fuel filler lid assembly according to claim 9, wherein
the first part of the fuel filler lid having an aperture, the second part of the fuel filler lid being integrally attached to the first part so that the second part is disposed within the aperture.

11. The fuel filler lid assembly according to claim 10, wherein the aperture of the first part having a shape that corresponds to a shape of the second part.

12. The fuel filler lid assembly according to claim 11, wherein the aperture is on a side edge of the first part.

13. The fuel filler lid assembly according to claim 9, wherein the second part extends from the first part in a direction towards the fuel filler opening so that the second part is closer to the fuel filler opening than the first part is to the vehicle filler opening.

14. The fuel filler lid assembly according to claim 9, further comprising a fuel filler base that is fixed to the vehicle body and having an opening that corresponds to the fuel filler opening, the fuel filler lid being pivotally attached to the fuel filler base.

15. The fuel filler lid assembly according to claim 9, further comprising a fuel filler base that is fixed to the vehicle body and having an opening that corresponds to the fuel filler opening, the fuel filler lid being pivotally attached to the fuel filler base.

16. A fuel filler lid assembly, comprising:

a vehicle body having a fuel filler opening; and a fuel filler lid supported to the vehicle body, the fuel filler lid having a first part that is movable with respect to the vehicle body between an open state to enable access to the fuel filler opening and a closed state to cover the fuel filler opening, the fuel filler lid having a second part that is indented with respect to the first part by a user operation surface that is accessed by a user to move the fuel filler lid between the open state and the closed state, the fuel filler lid having a pocket formed by the connection of the second part, the user operation surface and a portion of the first part.

\* \* \* \* \*